(12) United States Patent
Abe (10) Patent No.: US 6,665,149 B2
(45) Date of Patent: Dec. 16, 2003

(54) CONNECTOR FOR FLEXIBLE PRINTED CIRCUIT BOARDS, HEAD ACTUATOR PROVIDED WITH THE SAME, AND DISK DRIVE

(75) Inventor: Toshiaki Abe, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 76 days.

(21) Appl. No.: 10/106,125

(22) Filed: Mar. 27, 2002

(65) Prior Publication Data

US 2003/0002222 A1 Jan. 2, 2003

(30) Foreign Application Priority Data

Jun. 29, 2001 (JP) ........................................ 2001-200177

(51) Int. Cl.[7] .............................................. G11B 21/08
(52) U.S. Cl. .................................................. 360/264.2
(58) Field of Search ........................... 360/264.2–264.5, 360/97.01–97.04; 439/676, 217, 218

(56) References Cited

U.S. PATENT DOCUMENTS 6,594,107 B2 * 7/2003 Hayakawa et al. ...... 360/97.01
6,595,805 B2 * 7/2003 Pocrass ..................... 439/676

FOREIGN PATENT DOCUMENTS

JP    2000-123333 A    4/2000

\* cited by examiner

Primary Examiner—Allen Cao
(74) Attorney, Agent, or Firm—Pillsbury Winthrop LLP (57) ABSTRACT

On each arm of a head actuator is provided a relay PFC that extends from a magnetic head to the proximal end portion of the arm. Each relay FPC includes a connecting portion having a first contact, a short-circuit contacts and a short-circuit piece that constitutes a closed loop. The connecting portions are opposed to each other and form a female connector. A male connector attached to a main FPC has a projection detachably fitted in the female connector, second contacts provided on the projection and connected to the main FPC, and a pressing projection that presses the short-circuit piece and release the closed loop. As the projection of the male connector is fitted between the connecting portions of the female connector, the first and second contacts come into contact with each other, whereupon the relay FPC and the main FPC are connected electrically to each other.

18 Claims, 7 Drawing Sheets

CONNECTOR FOR FLEXIBLE PRINTED CIRCUIT BOARDS, HEAD ACTUATOR PROVIDED WITH THE SAME, AND DISK DRIVE

CROSS-REFERENCE TO RELATED APPLICATIONS

This application is based upon and claims the benefit of priority from the prior Japanese Patent Application No. 2001-200177, filed Jun. 29, 2001, the entire contents of which are incorporated herein by reference.

BACKGROUND OF THE INVENTION

1. Field of the Invention

The present invention relates to a connector for connecting flexible printed circuit boards, a head actuator provided with the connector, and a disk drive.

2. Description of the Related Art

In general, a disk drive such as a magnetic disk drive comprises magnetic disks, a spindle motor for supporting and rotating the magnetic disks, a head actuator supporting magnetic heads, a voice coil motor for driving the head actuator, a substrate unit, etc., which are housed in a casing.

The head actuator includes a bearing portion attached to the casing and a plurality of arms extending from the bearing portion. A magnetic head is mounted on each arm by means of a suspension. The substrate unit includes a main flexible printed circuit board (hereinafter referred to as main FPC), the distal end portion of which extends close to the bearing portion. Each magnetic head is connected to one end of a relay flexible printed circuit board (hereinafter referred to as relay FPC) on each arm, and the other end portion of the relay FPC is connected to the main FPC. Thus, each magnetic head is connected electrically to the substrate unit through the relay and main FPC's and controlled by means of the substrate unit.

In the case where the printed circuit boards are connected electrically to each other in this manner, each printed circuit board is provided with connecting pads, a pre-tinning layer is formed on each connecting pad, and the pads are opposed to one another. In this state, the pre-tinning layer is heated from the base-layer side of one of the printed circuit boards. By doing this, the pre-tinning layer is melted to connect the pads electrically and mechanically.

Possibly, the relay and main FPC's may be connected by contact bonding. In the magnetic disk drive, however, the connected portion between the relay and main FPC's moves as the head actuator rocks, and is subjected to vibration and shock. Accordingly, soldering is widely used to improve the reliability of connection.

In conventional assembly processes for a magnetic disk drive, soldering the FPC's is carried out in a clean room. However, the soldering operation includes a process for melting solder by means of a soldering iron. In this process, outgassing from a flux or the like in the solder may generate, possibly contaminating the atmosphere in the clean room and exerting a bad influence upon other components.

Further, soldering the relay and main FPC's involves operation for soldering very fine connecting pads, so that the reliability of the soldering is easily influenced by workmanship.

Furthermore, repairing the head actuator requires resoldering after the solder on the connecting portions is removed. Thus, repairs are troublesome and their achievement level easily lowers. In addition, an MR element is used for the magnetic head being in current use so that the magnetic head of this type is very weak against static electricity. Therefore, in assembly for a head actuator and magnetic disk drive provided with the same, it is necessary to take measures against electrostatic breakdown to prevent a large current from flowing into the magnetic head from outside.

BRIEF SUMMARY OF THE INVENTION

The present invention has been achieved in consideration of these circumstances, and its object is to provide a connector for flexible printed circuit boards, capable of easily securely connecting flexible printed circuit boards, a head actuator provided with the same, and a disk drive.

In order to achieve the above object, a connector for flexible printed circuit boards according to an aspect of the invention is a connector for electrically connecting a pair of first flexible printed circuit boards, fixed individually on the respective surfaces of two arms spaced and opposed to each other and each extending from a distal end portion of each arm to a proximal end portion thereof, and a second flexible printed circuit board extending from any other portion than the arms toward the proximal end portions. The connector comprises: a female connector formed of the first flexible printed circuit boards; and a male connector provided at the second flexible printed circuit board.

The female connector includes a pair of connecting portions formed on respective proximal-side end portions of the first flexible printed circuit boards and opposed to each other across a given space, each of the connecting portions having first contacts formed by exposing a part of a conductor pattern of the first flexible printed circuit board, a plurality of short-circuit contacts and a short-circuit piece which contacts with the plurality of short-circuit contacts so as to turn the conductor pattern into a closed loop.

The male connector includes a projection and a pressing portion which are configured to be fitted between the connecting portions of the female connector, second contacts provided on the projection and connected to a conductor pattern of the second flexible printed circuit board, the second contacts being arranged so as to contact with the first contacts when the projection is fitted between the connecting portions, and the pressing portion being configured to press and detach the short-circuit piece from the short-circuit contacts and release the closed loop when the pressing portions are fitted between the connecting portions.

According to the connector for flexible printed circuit boards constructed in this manner, the first flexible printed circuit boards and second flexible printed circuit boards can be connected electrically to each other by only inserting and fitting the projections and pressing portions of the male connector that is attached to the second flexible printed circuit boards into the spaces between the connecting portions of the female connectors. Thus, connecting the first and second flexible printed circuit boards requires no soldering, and therefore, never contaminates the atmosphere in a clean room. Further, no veteran skill is needed, and variation in workmanship can be lowered.

In addition, since the female connectors are constructed by opposing the connecting portions of the first flexible printed circuit boards that are attached to the arms, no dedicated housings for the connectors are needed, so that the construction can be simplified.

The connecting portion provided on the first flexible printed circuit board of each arm has the short-circuit contacts and short-circuit piece that short-circuits the same, and thus the arm itself comprises a short-circuit mechanism for preventing electrostatic breakdown from occurring thereon. Therefore, even in the state that the arm has not been assembled and remains intact, it is possible to prevent electrostatic breakdown from occurring on electronic components connected to the first flexible printed circuit board.

Furthermore, when the male connector is connected to the female connectors, being linked with this connection, the short-circuit carried out by the short-circuit piece is released. Thus the first and second main flexible printed circuit boards can be electrically connected to each other. When the male connector is detached from the female connectors, a closed loop is formed in the first flexible printed circuit boards by means of each short-circuit piece again, thereby firmly preventing electrostatic breakdown from occurring on the electronic components.

Consequently, by inserting and extracting the male connector in and from the female connector, a function of preventing electrostatic breakdown can be stopped or resumed easily. Thus, the connection between the first and second flexible printed circuit boards can be facilitated, moreover, repairs such as replacing the electronic components can be carried out easily.

A head actuator according to another aspect of the invention comprises: a bearing portion; two arms each having a proximal end portion attached to the bearing portion, and a distal end portion supporting a head, extending from the bearing portion, the arms being opposed to each other across a given space; first flexible printed circuit boards fixed individually on the respective arms, connected electrically to the respective heads, and extending from the heads to the proximal end portions of the arms; a second flexible printed circuit board connected to the first flexible printed circuit boards; and a male connector attached to the second flexible printed circuit board.

Each of the first flexible printed circuit boards includes a connecting portion provided at the proximal end portion of the arm and having first contacts formed by exposing a part of a conductor pattern, a plurality of short-circuit contacts, and a short-circuit piece which contacts with the plurality of short-circuit contacts so as to turn the conductor pattern into a closed loop.

The respective connecting portions on the two arms are opposed to each other across a given space to constitute a female connector.

The male connector includes a projection and a pressing portions which are configured to be fitted between the connecting portions of the female connector, and second contacts provided on the projection and connected to a conductor pattern of the second flexible printed circuit board, the second contacts being arranged so as to contact with the first contacts when the projection is fitted between the connecting portions, and the pressing portions being arranged so as to press and detach the short-circuit piece from the short-circuit contacts, and release the closed loop when the pressing portions are fitted between the connecting portions.

A disk drive according to still another aspect of the invention comprises a disk; a head configured to write in and retrieving information from the disk; a head actuator supporting the head for movement with respect to the disk; a substrate unit configured to input and output signals with respect to the head; a main flexible printed circuit board extending from the substrate unit and connected to the head actuator; and a male connector attached to the main flexible printed circuit board.

The head actuator includes a bearing portion; two arms each having a proximal end portion attached to the bearing portion, and a distal end portion supporting the head, extending from the bearing portion, the arms being opposed to each other across a given space; and relay flexible printed circuit boards fixed individually on the respective arms, connected electrically to the respective heads, and extending from the heads to the proximal end portions of the arms.

Each of the relay flexible printed circuit boards includes a connecting portion provided at the proximal end portion of the arm and having first contacts formed by exposing a part of a conductor pattern, a plurality of short-circuit contacts and a short-circuit piece which contacts with the plurality of short-circuit contacts so as to turn the conductor pattern into a closed loop, the connecting portions being opposed to each other across a given space to constitute a female connector.

The male connector includes a projection and a pressing portions which are configured to be fitted detachably in and from the female connector, and second contacts exposed on the projection and connected to a conductor pattern of the main flexible printed circuit board.

The first contacts of the female connectors and the second contacts of the male connector are pressed to each other by fitting the projection and pressing portion of the male connector into the connecting portions of the female connectors, so that the relay flexible printed circuit board and the main flexible printed circuit board are electrically connected to each other, and the short-circuit piece is pressed by means of the pressing portion to come apart from the short-circuit contacts, thereby releasing the closed loop.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

A hard disk drive (hereinafter referred to as HDD) as a disk drive according to an embodiment of the present invention will now be described in detail with reference to the accompanying drawings.

Figure 1:
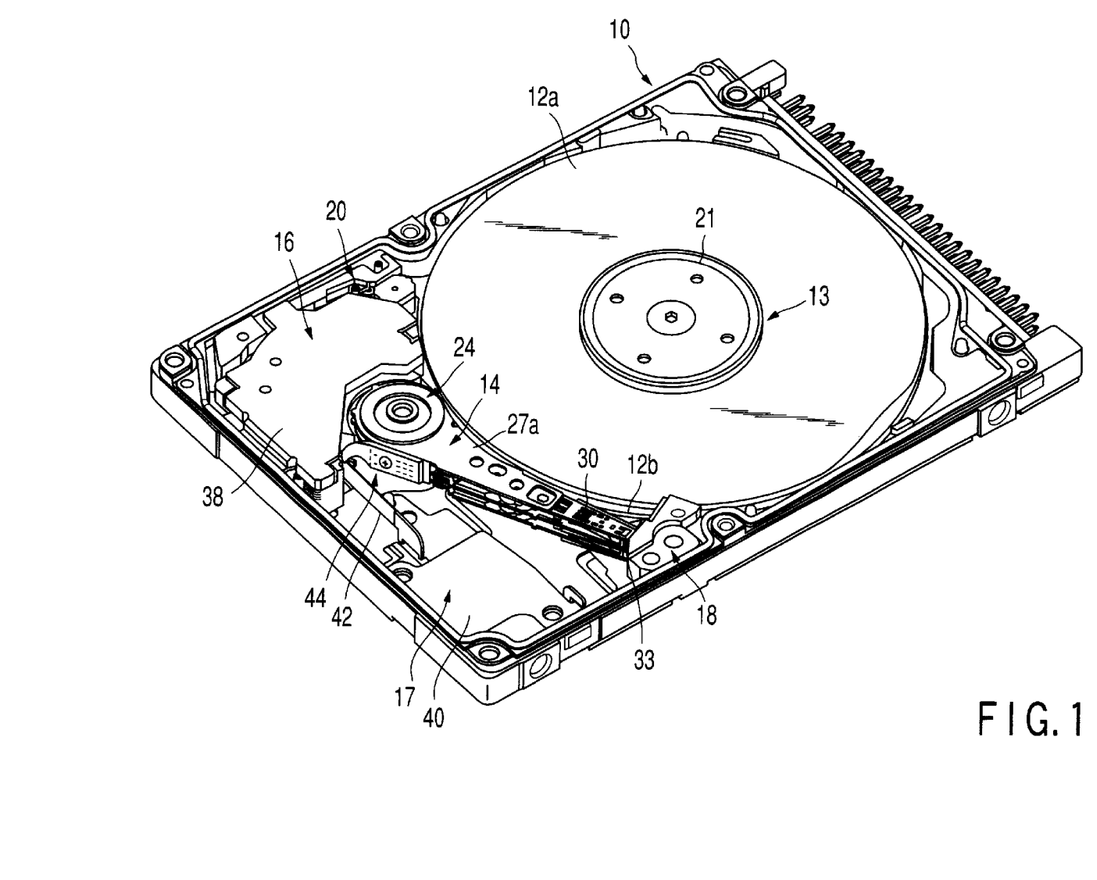
FIG. 1 is a perspective view showing the interior of an HDD according to an embodiment of the present invention.

As shown in FIG. 1, the HDD comprises a casing 10 in the form of an open-topped rectangular box and a top cover (not shown) that is fixed to the casing by means of screws and covers the top opening of the casing.

The casing 10 is stored with two magnetic disks 12a and 12b for use as magnetic recording media, a spindle motor 13 for supporting and rotating the magnetic disks, magnetic heads for writing in and reading information from the magnetic disks, a head actuator 14 that support the magnetic heads for movement with respect to the magnetic disks 12a and 12b. The casing 10 is further stored with a VCM 16 for rocking and positioning the head actuator, a ramp load mechanism 18 that holds the magnetic heads in positions distant from the magnetic disks when the magnetic heads are moved to the outermost periphery of the magnetic disks, an inertia latch mechanism 20 for holding the head actuator in a refuge position, and a flexible printed circuit board unit (hereinafter referred to as FPC unit) 17 mounted with circuit components such as a preamplifier.

Further, a printed circuit board (not shown) for controlling the respective operations of the spindle motor 13, VCM 16, and magnetic heads by means of the FPC unit 17 is screwed to the outer surface of the casing 10 and opposed to the bottom wall of the casing.

Each of the magnetic disks 12a and 12b has a diameter of, for example, 65 mm (2.5 inches), and includes magnetic recording layers formed individually on its upper and lower surfaces. The two magnetic disks 12a and 12b are coaxially fitted on a hub (not shown) of the spindle motor 13, clamped by a clamp spring 21, and stacked in layers at a given space in the axial direction of the hub. The magnetic disks 12a and 12b are rotated at a given speed by means of the spindle motor 13.

Figure 2:
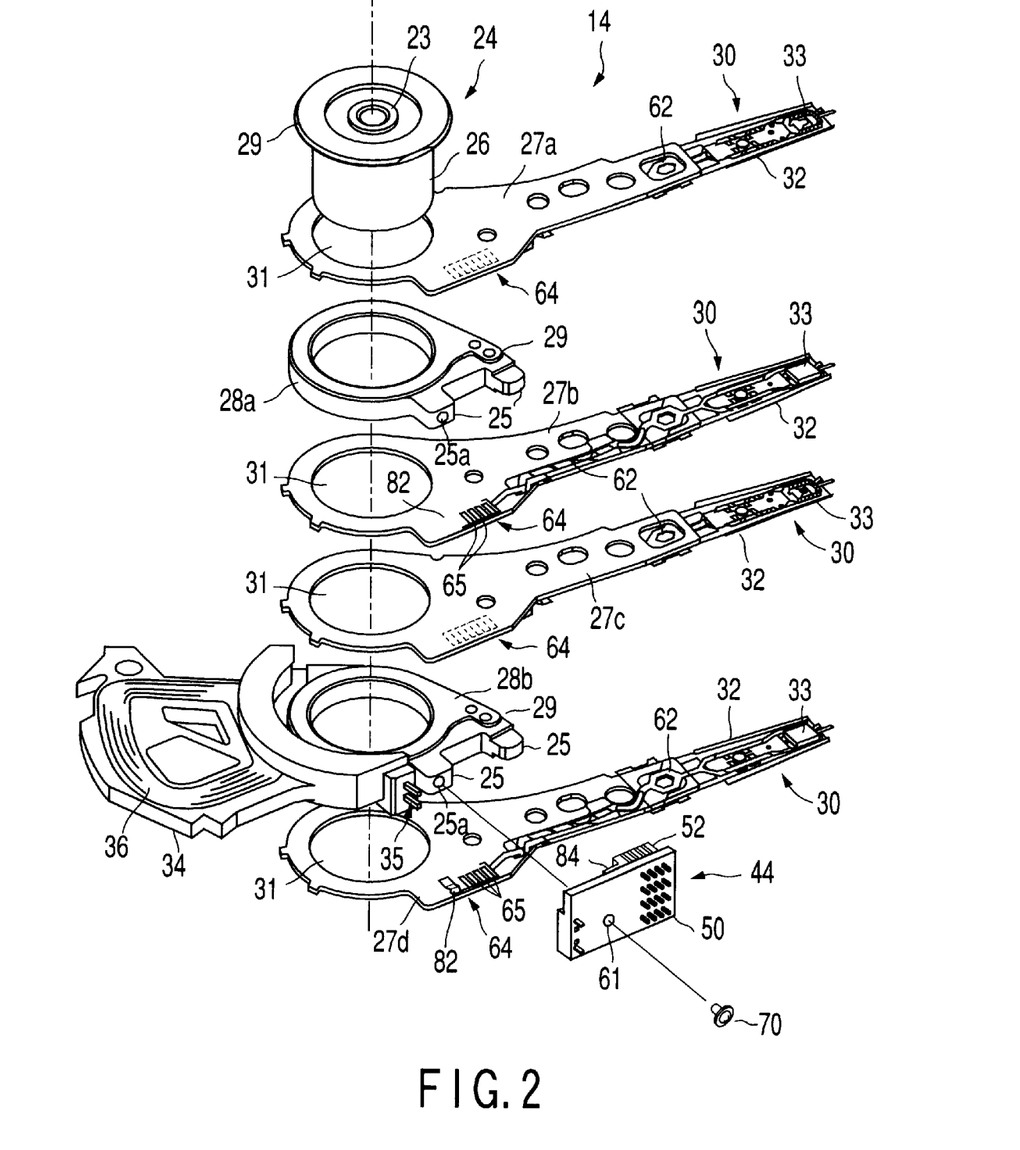
FIG. 2 is an exploded perspective view of a head actuator attached to the HDD.
Figure 3:
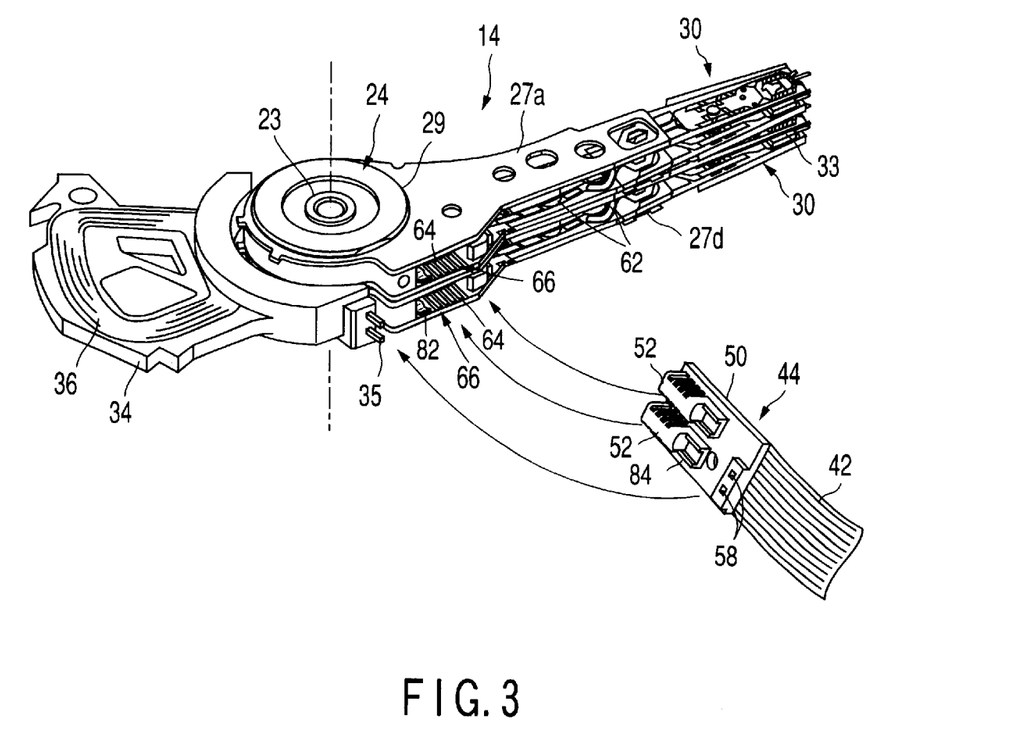
FIG. 3 is a perspective view of the head actuator.

As shown in FIGS. 1 to 3, the head actuator 14 is provided with a bearing assembly 24 that is fixed on the bottom wall of the casing 10. The bearing assembly 24, which serves as a bearing portion, includes a pivot 23 set up on the bottom wall of the casing 10 and a cylindrical hub 26 that is rotatably supported on the pivot by means of a pair of bearings. An annular flange 29 is formed on the upper end of the hub 26, and a thread portion (not shown) around the lower end portion of the hub.

Further, the head actuator 14 includes four arms 27a, 27b, 27c and 27d and two spacer rings 28a and 28b, which are mounted on the hub 26, and four magnetic head assemblies 30 supported on the arms, individually.

Each of the arms 27a to 27b is a thin flat sheet of a stainless-steel-based material, such as SUS304, having a thickness of about 250 $\mu$m. A circular aperture 31 is formed in one end or proximal end of each arm.

Each magnetic head assembly 30 includes an elongate suspension 32 and a magnetic head 33 fixed to the suspension. The suspension 32 is formed of a plate spring with a thickness of 60 to 70 $\mu$m, and its proximal end is fixed to the distal end of each corresponding one of the arms 27a to 27d by spot welding or adhesive bonding and extends from the arm.

Each magnetic head 33 includes a substantially rectangular slider (not shown) and a writing/reading MR (magnetic reluctance) head formed on the slider, and is fixed to a gimbals portion that is formed on the distal end portion of the suspension 32. Further, each magnetic head 33 has four electrodes (not shown). The suspension 32 may be formed of the same material as and integrally with the arm. Each suspension 32 and its corresponding arm constitute an arm according to the present invention.

As shown in FIGS. 2 and 3, each magnetic head 33 of the head actuator 14 is connected electrically to a main FPC 42 (mentioned later) through a relay FPC 62. The relay FPC 62, which serves as a first flexible printed circuit board, is fixedly stuck on the respective surfaces of each arm and each suspension 32 of the head actuator 14, and extends from the distal end of the suspension to the proximal end of the arm.

The relay FPC 62 is in the form of an elongate belt as a whole, the distal end of which is connected electrically to the magnetic head 33, and the proximal end portion of which constitutes a connecting portion 64. The relay FPC 62 includes a base layer of an insulating material such as polyimide, a conductor pattern of a copper foil on the base layer, and a solder resist layer formed over the whole conductor pattern on the base layer except pad portions.

The electrodes of the magnetic head 33 are soldered to the pad portions (not shown) on the distal end portion of the relay FPC 62. Further, as shown in FIGS. 2 to 4C, the connecting portion 64 of the relay FPC 62 includes a plurality of first contacts 65 that are formed by exposing parts of the conductor pattern, and is located adjacent to a side edge of the arm at the proximal end portion of the arm. Each connecting portion 64 includes four elongate first contacts 65, which extend in a direction substantially perpendicular to the longitudinal direction of the arm or to the side edge of the arm, and are arranged at given spaces in the longitudinal direction of the arm.

Figure 4A:
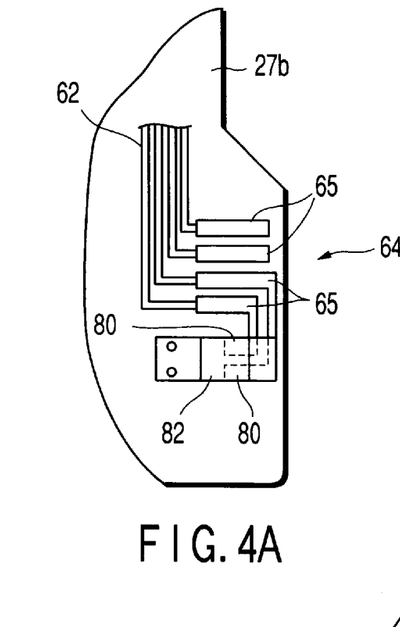
FIGS. 4A, 4B and 4C are plan view, sectional view and perspective view, respectively, showing a connecting portion provided on each arm of the head actuator.
Figure 4B:
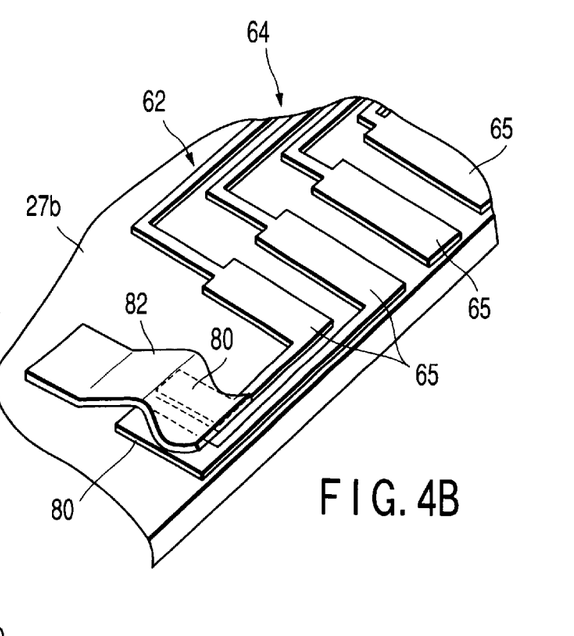
Figure 4C:
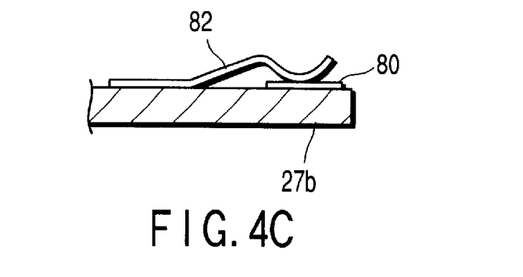

Each connecting portion 64 includes a pair of short-circuit contacts 80 located parallel to the first contacts 65. The short-circuit contacts 80 are connected respectively to two of the first contacts 65. Further, a short-circuit piece 82 made of metal and having a spring property is fixed on the connecting portion 64. A tip portion of the short-circuit piece 82 is resiliently pressed against the pair of short-circuit contacts 80, thereby electrically conducting, i.e., short-circuiting the short-circuit contacts 80. Therefore, the conductor pattern of the relay FPC 62 extending from the magnetic head 33 becomes a closed loop. As a result, a head arm alone can prevent excessive current from flowing into the magnetic head 33, thereby preventing electrostatic breakdown in the magnetic head from occurring. In the manner described above, the short-circuit contacts 80 and short-circuit piece 82 constitute a short-circuit mechanism for preventing the electrostatic breakdown in the magnetic head 33 from occurring.

Note that, although the arm 27b is represented for the explanation in FIG. 4A or 4C, the connecting portions 64 provided on the other arms 27a, 27c and 27d are constructed in the same manner as the connecting portion described above.

As described above, the four arms 27a, 27b, 27c and 27d, thus fitted with the magnetic head assembly 30 and the relay FPC 62 each, are stacked on the flange 29 and mounted on the hub 26 in a manner such that the hub is passed through their respective apertures 31. Further, the spacer rings 28a and 28b are fitted on the hub 26 in a manner such that they are sandwiched between the arms 27a and 27b and between the arms 27c and 27d, respectively.

The four arms 27a to 27d and the two spacer rings 28a and 28b that are fitted on the hub 26 are interposed between the flange 29 and a nut (not shown) that is screwed on the thread portion of the hub 26, and are fixedly held on the hub 26. Thus, the four arms 27a to 27d extend parallel to one another in the same direction from the hub 26 with given spaces between them.

The magnetic head assemblies 30 and the magnetic heads 33 that are mounted on the arms 27a and 27b are opposed to one another. Likewise, the magnetic head assemblies 30 and the magnetic heads 33 that are mounted on the arms 27c and 27d are opposed to one another. The arms 27a to 27d and the magnetic head assemblies 30 fixed thereon can rock integrally with the hub 26.

As shown in FIGS. 2 and 3, moreover, the respective connecting portions 64 of the relay FPC's 62 that are attached individually to the arms 27a and 27b are opposed to each other at the respective proximal end portions of the arms with a given space between them, and constitute a female connector 66 for the connection of the main FPC (mentioned later). Likewise, the respective connecting portions 64 of the relay FPC's 62 that are attached individually to the arms 27c and 27d are opposed to each other at the respective proximal end portions of the arms with a given space between them, and constitute another female connector 66 for the connection of the main FPC.

As shown in FIG. 2, each of the spacer rings 28a and 28b has an extending portion 21 that extends toward a side edge of the proximal end portion of its corresponding arm and close to the connecting portion 64 of the relay FPC 62. The extending portion 21 is formed having a pair of abutting portions 25 that project to the side edge of the arm. These abutting portions 25 are spaced in the extending direction of the arm and situated individually on the opposite sides of the connecting portion 64. When the arms 27a to 27d and the spacer rings 28a and 28b are mounted on the hub 26 of the bearing assembly 24, therefore, the extending portion 21 and the abutting portions 25 of each spacer ring are situated surrounding the whole periphery of each corresponding two adjacent or opposite connecting portions 64 except the side edge portion of the arm. A tapped hole 25a for a male connector 44 (mentioned later) is formed in one of the abutting portions 25 of each of the spacer rings 28a and 28b.

The spacer ring 28b has a support frame 34 that extends in the direction opposite from the extending direction of the arms 27a to 27d, and is integrally formed of a synthetic resin or the like. A voice coil 36 that constitutes a part of the VCM 16 is embedded in the frame 34. Two pin-shaped third contacts 35 protrude from the frame 34 and are situated side by side with the female connectors 66. The third contacts 35 are connected electrically to the voice coil 36 by means of wires (not shown) that are embedded in the support frame 34.

When the head actuator 14 constructed in this manner is set in the casing 10, as seen from FIG. 1, the magnetic disk 12a is situated between the arms 27a and 27b, while the disk 12b is situated between the arms 27c and 27d.

When the HDD is actuated, the magnetic heads 33 that are attached to the arms 27a and 27b are opposed individually to the upper and lower surfaces of the magnetic disk 12a, and hold the disk 12a from both sides. Likewise, the magnetic heads 33 that are attached to the arms 27c and 27d are opposed individually to the upper and lower surfaces of the magnetic disk 12b, and hold the disk 12 from both sides.

When the head actuator 14 is set in the casing 10, moreover, the voice coil 36 that is fixed to the support frame 34 is situated between a pair of yokes 38 that are fixed on the casing 10. The yokes 38 and a magnet (not shown) that is fixed to one of the yokes constitute the VCM 16. When the voice coil 36 is energized, the head actuator 14 rocks, whereupon the magnetic heads 33 are moved to and positioned on desired tracks of the magnetic disks 12a and 12b.

As shown in FIGS. 1 to 4C, the FPC unit 17 has a rectangular board body 40 that is fixed on the bottom wall of the casing 10, and a plurality of electronic components, connectors, etc. are mounted on the board body. Further, the FPC unit 17 includes the belt-shaped main flexible printed circuit board (referred to as main FPC) 42 that electrically connects the board body 40 and the head actuator 14. The main FPC 42, which serves as a second flexible printed circuit board, extends from the board body 40. A male connector 44 for electrically connecting the main FPC 42 and the head actuator 14 is stuck on the rear surface of the extending end portion of the main FPC 42. The main FPC 42 is formed integrally with the board body 40.

The main FPC 42 includes a base film of an insulating material such as polyimide, a conductor pattern that is formed by patterning a copper foil formed on the base film, and a solder resist layer formed of an insulating material that covers the whole area of the conductor pattern and the base film except pad portions of the conductor pattern that are situated on the extending end portion the main FPC.

Figure 5:
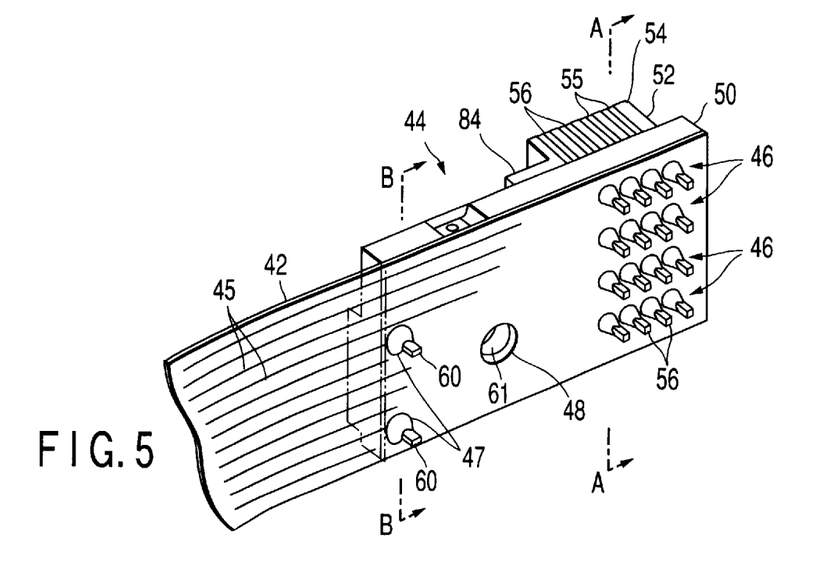
FIG. 5 is a perspective view showing a male connector for the head actuator.

As shown in FIGS. 3 and 5, the conductor pattern of the main FPC 42 includes a number of conducting wires 45 that extend parallel to one another in the axial direction of the FPC. Further, the extending end portion of the main FPC 42 is formed having four connecting pad groups 46 corresponding to the magnetic heads 33 in number and two pad portions 47 that are to be connected to the voice coil 36. The pad groups 46 and the pad portions 47 connected to the board body 40 by means of the conducting wires 45, individually. Each connecting pad group 46 includes six connecting pads corresponding to the electrodes of the magnetic head 33 and the poles of a head IC in number. The connecting pads are spaced and arranged side by side in a straight line in the axial direction of the main FPC 42. Further, the extending end portion of the main FPC 42 is formed having a through hole 48, which is used in screwing the distal end portion of the FPC to the bearing assembly 24 of the head actuator 14.

As shown in FIGS. 3 and 5 to 6C, the male connector 44 that is attached to the extending end portion of the main FPC 42 includes a base 50 in the form of a rectangular plate and a pair of rectangular projections 52 that protrude from one surface of the base at right angles to it. The male connector 44 is integrally formed of an insulating material such as a synthetic resin. The base 50 has a thickness of about 0.5 mm, and is formed of a synthetic resin that contains glass in order to maintain its strength. The extending end portion of the main FPC 42 is stuck on the other surface of the base 50.

The paired projections 52 are formed having a size and shape such that they can be fitted individually into the female connectors 66 of the head actuator 14. They are arranged parallel to each other with a given space between them, and extend in the longitudinal direction of the main FPC 42. Each projection 52 has a pair of connecting surfaces 54 that extend perpendicularly from the base 50 in the longitudinal direction of the main FPC 42. The connecting surfaces 54 are opposed to each other across a given space. Each connecting surface 54 is formed having six engaging grooves 55 that extend at right angles to the base 50 and are arranged at given spaces in the longitudinal direction of the main FPC 42.

Each engaging groove 55 is fitted with a second contact 56 in the form of an elongate rod for electrical connection with the relay FPC 62 of the head actuator 14. The second contacts 56 extend along the grooves 55 and slightly project from their corresponding connecting surfaces 54. Further, the second contacts 56 penetrate the base 50 and the main FPC 42 and project from the main FPC, and are soldered individually to their corresponding pad portions of the pad groups 46 of the main FPC. Thus, the second contacts 56, twelve in total number, on each projection 52 are connected electrically to the conductor pattern of the main FPC 42.

Furthermore, the male connector 44 includes a pair of pressing projections 84 that protrude perpendicularly from one surfaces of the base 50. Each of the pressing projections 84 is made of an insulating material such as a synthetic resin and formed integrally with the projection 52. The pressing projections 84 serving as pressing members extend continuously with the projection 52 in the longitudinal direction of the main FPC 43.

In addition, each pressing projections 84 has a pair of pressing claws 85 extending perpendicularly from the base 50. The pressing claws 85 are opposed to each other with a predetermined space. When the male connector 44 is connected to the female connectors 66 of the head actuator 14, the pressing claws 85 press their corresponding short-circuit pieces 82 in the direction to disengage from the short-circuit contacts 80 so as to release a short-circuit. More specifically, the pressing claws 85 function as a short-circuit releasing portion which releases the closed loop of the relay FPC 62.

Figure 6A:
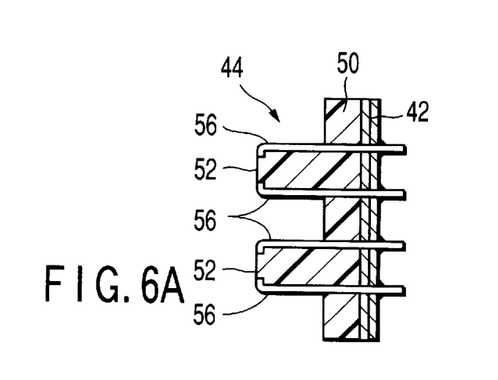
FIG. 6A is a sectional view of the male connector taken along the line IVA—IVA in FIG. 5.
Figure 6B:
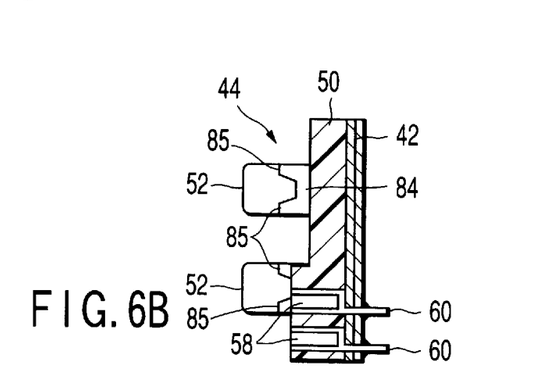
FIG. 6B is a sectional view of the male connector taken along the line IVB—IVB in FIG. 5.
Figure 6C:
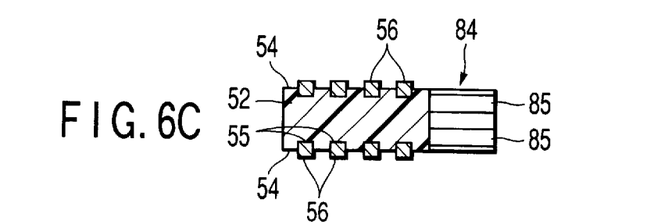
FIG. 6C is a sectional view of a projection of the male connector.
Figure 7A:
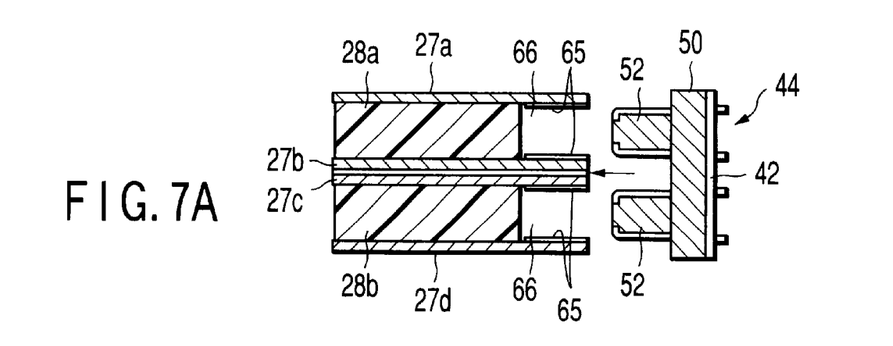
FIGS. 7A and 7B are sectional views schematically showing a process of connecting female connectors of the head actuator to the male connector.
Figure 7B:
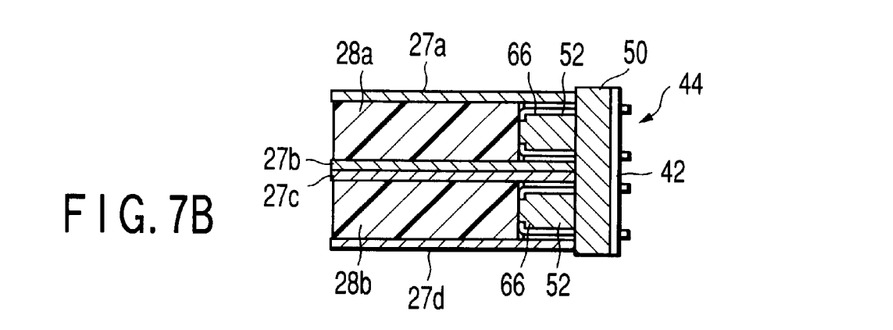

The male connector 44 is provided with fourth contacts 60 for current supply to the voice coil 36 and hybridized. More specifically, a pair of through holes 58 are formed in the base 50, and the fourth contacts 60 are arranged individually in the through holes so as to extend along their respective inner peripheral surfaces. The fourth contacts 60 penetrate the main FPC 42 and project from it, and are soldered individually to their corresponding pad portions 47 of the main FPC. Thus, the two fourth contacts 60 are connected electrically to the conductor pattern of the main FPC 42.

The base 50 of the male connector 44 is formed having a through hole 61 through which the male connector, along with the main FPC 42, is screwed to the head actuator 14. The through hole 61 is aligned with the through hole 48 of the main FPC.

In connecting the main FPC 42, fitted with the male connector 44 constructed in this manner, to the head actuator 14, the projections 52 are fitted into their corresponding female connectors 66, as shown in FIGS. 3, 7A, 7B and 8. In this case, the projections 52 and pressing projections 84 are inserted therein with the paired abutting portions 25 used as guides. The paired abutting portions 25 is provided on the spacer rings 28a and 28b, respectively. Thereupon, each of the projections 52 and pressing projections 84 are fitted in a manner such that they are situated in a predetermined position with respect to their corresponding female connector 66 or that they are positioned in the longitudinal direction C of the arms by means of each pair of abutting portions 25. Thus, the second contacts 56 on each projection 52 are pressed against the opposite first contacts 65 of the female connector 66 to make electrical conduction, whereupon the relay FPC 62 and the main FPC 42 are connected electrically to each other.

Figure 8:
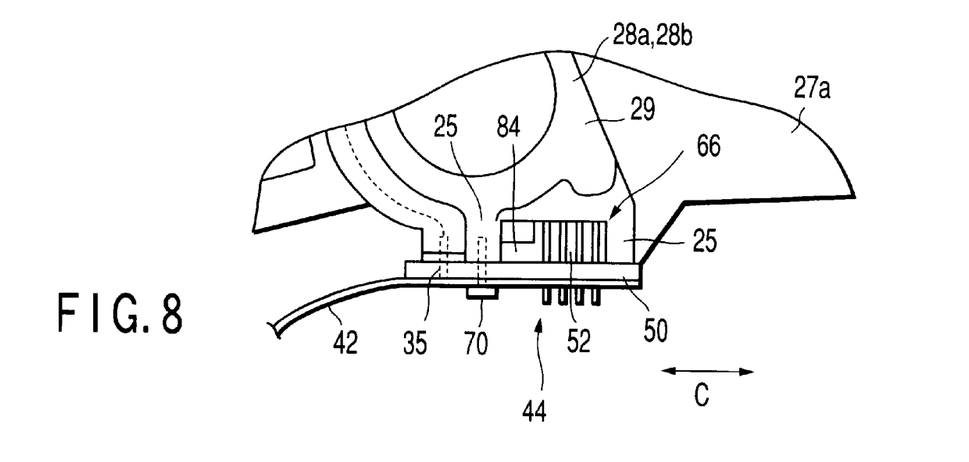
FIG. 8 is a sectional view schematically showing a state of connecting the female connectors of the head actuator to the male connector.

As the male connector 44 is connected to the female connectors 66 of the head actuator 14, moreover, two of the third contacts 35 that protrude from the support frame 34 are inserted and fitted into their corresponding through holes 58 of the male connector. Thus, the third contacts 35 are pressed against their corresponding fourth contacts 60 in the holes 58 to make electrical conduction, whereupon the voice coil 36 and the main FPC 42 are connected electrically to each other.

Figure 9A:
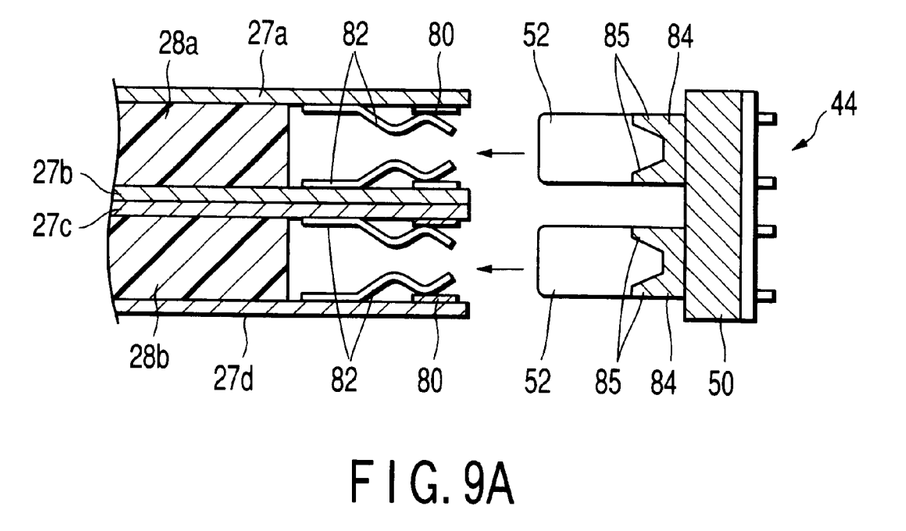
FIGS. 9A and 9B are sectional views schematically showing a process for releasing a closed loop corresponding to connection of the female connectors of the head actuator to the male connector.
Figure 9B:
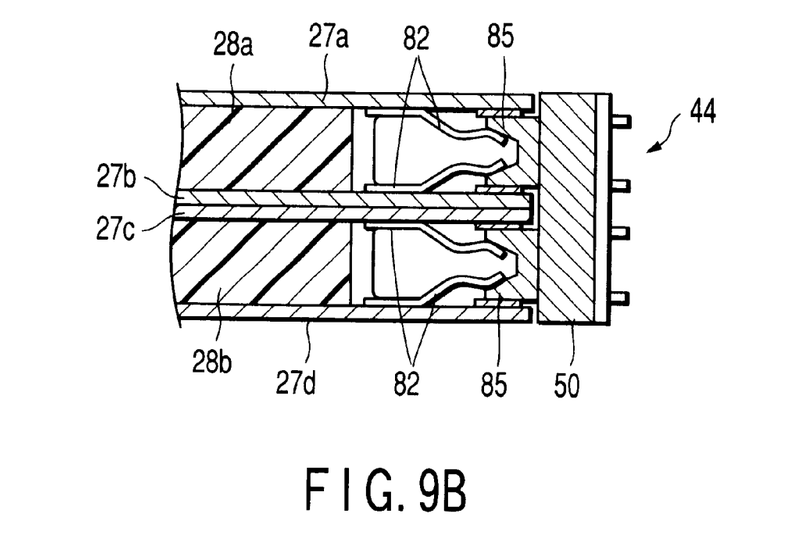

In addition, as the male connector 44 is connected to the female connectors 66 of the head actuator 14 in the manner shown in FIGS. 9A and 9B, the second contacts 56 of each projection 52 are pressed by means of the first contacts 65 of each female connector 66 to make electrical conduction. After that, each pressing claw 85 of each pressing projection 84 formed on the male connector 44 is thrust between their corresponding short-circuit piece 82 and the short-circuit contacts 80. Thus each short-circuit piece 82 is pressed by the pressing claw 85 and strained resiliently, thereby leaving from the short-circuit contacts 80. As a result, the short-circuit of the paired short-circuit contacts 80 in each connecting portion 64 is released so that the closed loop between the magnetic head 33 and the relay FPC 62 is released, that is, the circuit is opened. At this time, the magnetic head 33 has been connected to the male connector 44 so that the closed loop is provided in the different manner. Therefore, electrostatic breakdown does not occur thereto.

After the male connector 44 is connected to the head actuator 14, a screw 70 is driven into the tapped hole 25a in the one abutting portion 25 of the spacer ring 28b through the through hole 48 of the main FPC 42 and the through hole 61 of the male connector, whereby the male connector 44 is screwed to the bearing assembly 24. Thereupon, connecting the main FPC 42 to the head actuator 14 is finished.

Note that, when the male connector 44 of the main FPC 42 is disconnected from the female connectors 66 of the head actuator 14 in order to maintain or repair the HDD, each pressing projection 84 of the male connector 44 is disengaged firstly from the short-circuit piece 82 of the female connector 66. Thus, the short-circuit piece 82 comes into contact with the pair of short-circuit contacts 80 again by its own elasticity, thereby turning the circuit of the magnetic head 33 and relay FPC 62 into a closed loop.

After forming the closed loop in the manner described above and preventing electrostatic breakdown from occurring on the magnetic head, the second contacts 56 of each projection 52 are disengaged from the first contacts 65 of the female connector 66, and the connection between the first and second contacts is released.

According to the HDD constructed in this manner, the relay FPC 62 and the main FPC 42 can be connected electrically to each other by only inserting and fitting the projections 52 of the male connector 44 that is attached to the main FPC 42 into the spaces between the connecting portions 64 of the female connectors 66 that are attached to the head actuator 14. Thus, connecting these FPC's requires no soldering, and therefore, never contaminates the atmosphere in a clean room. Further, no veteran skill is needed, and variation in workmanship can be lowered. In consequence, the assembly time can be shortened to improve the manufacturing efficiency and lower the manufacturing cost, and the reliability of connection can be improved.

Since the female connectors 66 are constructed by opposing the connecting portions 64 of the relay FPC's 62 that are attached individually to the arms, moreover, they can be automatically formed by attaching the arms to the bearing assembly 24. Since the abutting portions 25 of the spacer rings 28*a* and 28*b* can double as the respective housings of the female connectors 66, furthermore, no dedicated housings for the connectors are needed, so that the construction can be simplified.

The first and second contacts 65 and 56 can be accurately connected to one another by positioning the male connector 44 with respect to the female connectors 66 by means of the abutting portions 25 of the spacer rings 28*a* and 28*b*. Thus, the pitches of the contacts can be narrowed, so that the connectors can be miniaturized. Further, screwing can improve the reliability of prevention of disengagement that is attributable to vibration, shock, and rotation of the head actuator.

The connecting portion 64 of each arm of the head actuator 14 has the short-circuit contacts 80 and short-circuit piece 82 which short-circuits the short-circuit contacts 80, and thus the arm itself comprises a short-circuit mechanism for preventing electrostatic breakdown from occurring thereon. Therefore, even in the state that the arm has not been assembled and remains intact, it is possible to prevent electrostatic breakdown from occurring on the magnetic head 33.

Furthermore, when the male connector 44 of the main FPC 42 is connected to the female connectors 66 of the head actuator 14, being linked with this connection, the short-circuit carried out by the short-circuit piece 82 is released. Thus the magnetic head 33 and main FPC can be connected electrically to each other. When the male connector 44 of the main FPC 42 is detached from the female connectors 66 of the head actuator 14, a closed loop is formed again in the circuit of each magnetic head by means of each short-circuit piece 82, thereby firmly preventing electrostatic breakdown from occurring on the magnetic head.

Consequently, by fitting and extracting the male connector 44 in and from female connectors 66, a function of preventing electrostatic breakdown can be stopped or resumed easily. Thus, the connection between the head actuator 14 and the main FPC 42 can be facilitated, moreover, repairs such as replacing the magnetic head in the head actuator etc. can be carried out easily.

Furthermore, the female connectors 66 are provided on the respective proximal end portions of the arms for rocking motion, and the male connector 44 is connected to the female connectors. Therefore, the center of gravity of the connectors can be situated close to the center of rotation of the head actuator 14, so that the moment of inertia can be lowered, and the accessing speed can be improved.

According to the embodiment described above, the male connector 44 is provided with the fourth contacts 60 for the connection between the voice coil 36 and the main FPC 42. Therefore, male connector 44 can be hybridized, and the relay FPC's 62 and the voice coil 36 can be connected to the main FPC 42 by means of only one connector. Thus, the main FPC 42 can be connected to the head actuator 14 entirely by connector-connection, so that the connecting operation can be made easier.

The following is a description of a head actuator 14 of an HDD according to a second embodiment of the invention and its structure for connection. Like reference numerals are used to designate like portions of the first and second embodiments, and a detailed description of those portions is omitted. Thus, only differences between the two embodiments will be described in detail below.

According to the second embodiment, as shown in FIGS. 8 to 10B, a support frame 34 of the head actuator 14 is provided with a flexible printed circuit board for connection (hereinafter referred to as connecting FPC) 72 that is connected electrically to a voice coil 36. The connecting FPC 72 extends close to female connectors 66. A connecting portion having a third contact 35 is formed by exposing pad portions of a conductor pattern.

A male connector 44 has a pair of engaging projections 74 that protrude perpendicularly from a base 50 and are opposed to each other across a given space. A fourth contact 60 is fixed to the inner surface of each engaging projection 74. Each fourth contact 60 penetrates the base 50 and a main FPC 42 and projects from the main FPC. It is soldered to its corresponding pad portion of the main FPC. Thus, the two fourth contacts 60 are connected electrically to the conductor pattern of the main FPC 42.

When the male connector 44 constructed in this manner is connected to the female connectors 66 of the head actuator 14, a side edge portion of the support frame 34 of the support frame 34 on which the third contact 35 is provided is fitted in a fitting recess that is defined between the engaging projections 74. Thus, the fourth contacts 60 on the respective inner surfaces of the projections 74 are pressed against the third contact 35 on the support frame 34 to make electrical conduction, whereupon the voice coil 36 and the main FPC 42 are connected electrically to each other.

The second embodiment arranged in this manner can enjoy the same functions and effects of the foregoing embodiment. If the male connector 44 is hybridized according to the second embodiment, moreover, it is necessary only that the contacts are redirected, so that the cost of the connectors can be lowered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

According to the foregoing embodiments, for example, the arms are four in number. However, the number of the arms according to the invention is expected only be an even number, and may be two or six or more.

What is claimed is:

1. A connector of a head actuator of a disk drive for electrically connecting a pair of first flexible printed circuit boards, fixed individually on the respective surfaces of two arms spaced and opposed to each other and each extending from a distal end portion of each arm to a proximal end portion thereof, and a second flexible printed circuit board extending from any other portion than the arms toward the proximal end portions, the connector comprising:

a female connector formed of the first flexible printed circuit boards; and a male connector provided at the second flexible printed circuit board, the female connector including a pair of connecting portions formed on respective proximal-side end portions of the first flexible printed circuit boards and opposed to each other across a given space, each of the connecting portions having first contacts formed by exposing a part of a conductor pattern of the first flexible printed circuit board, a plurality of short-circuit contacts and a short-circuit piece which contacts with the plurality of short-circuit contacts so as to turn the conductor pattern into a closed loop, and the male connector including a projection and a pressing portion which are configured to be fitted between the connecting portions of the female connector, and second contacts provided on the projection and connected to a conductor pattern of the second flexible printed circuit board, the second contacts being arranged so as to contact with the first contacts when the projection is fitted between the connecting portions, and the pressing portion being configured to press and detach the short-circuit piece from the short-circuit contacts and release the closed loop when the pressing portion is fitted between the connecting portions.

2. The connector according to claim 1, wherein the first contacts of each connecting portion extend across the extending direction of the arms and are arranged substantially in parallel to each other at given spaces in the extending direction of the arm, the plurality of short-circuit contacts are arranged parallel to the first contacts and connected to the respective first contacts independently, the projection has a pair of connecting surfaces opposed individually to the pair of connecting portions of the female connector, the male connector has a plurality of second contacts provided individually on the connecting surfaces of the projection, corresponding to the first contacts, and the pressing portion has a pair of pressing claws which are configured to press the short-circuit pieces of the connecting portions, respectively.

3. The connector according to claim 1, wherein the male connector has a base fixed on an extending end portion of the second flexible printed circuit board and formed of an insulating material, the projection and the pressing portion are provided on the base and protrude therefrom, and the second contact provided on each connecting surface of the projection is connected to the conductor pattern of the second flexible printed circuit board.

4. The connector according to claim 1, wherein the short-circuit piece has elasticity and is configured to elastically deform and contact with the short-circuit contacts when the male connector is detached from the female connectors.

5. The connector according to claim 1, wherein the pressing portion is arranged such that, in a case where the male connector is connected to the female connector, the pressing portion presses the short-circuit piece after the first and second contacts are connected to each other, and in a case where the male connector is disconnected from the female connector, the pressing portion comes apart from the short-circuit piece before the connection between the first and second contacts is released.

6. A head actuator of a disk drive comprising:

a bearing portion;

two arms each having a proximal end portion attached to the bearing portion, and a distal end portion supporting a head, extending from the bearing portion, the arms being opposed to each other across a given space;

first flexible printed circuit boards fixed individually on the respective arms, connected electrically to the respective heads, and extending from the heads to the proximal end portions of the arms;

a second flexible printed circuit board connected to the first flexible printed circuit boards; and a male connector attached to the second flexible printed circuit board, wherein each of the first flexible printed circuit boards including a connecting portion provided at the proximal end portion of the arm and having first contacts formed by exposing a part of a conductor pattern, a plurality of short-circuit contacts and a short-circuit piece which contacts with the plurality of short-circuit contacts so as to turn the conductor pattern into a closed loop, the respective connecting portions on the two arms being opposed to each other across a given space to constitute a female connector, and the male connector including a projection and a pressing portion configured to be fitted between the connecting portions of the female connector, and second contacts provided on the projection and connected to a conductor pattern of the second flexible printed circuit board, the second contacts being arranged so as to contact with the first contacts when the projection is fitted between the connecting portions, and the pressing portion being arranged so as to press and detach the short-circuit piece from the short-circuit contacts and release the closed loop when the pressing portions are fitted between the connecting portions.

7. The head actuator according to claim 6, wherein the first contacts of each connecting portion extend across the extending direction of the arms and are arranged substantially parallel to each other at given spaces in the extending direction of the arm, the plurality of short-circuit contacts are arranged substantially parallel to the first contacts and connected to the respective first contacts independently, the projection has a pair of connecting surfaces opposed individually to a pair of connecting portions of the female connector, the male connector has a plurality of second contacts provided individually on the connecting surfaces of the projection, corresponding to the first contacts, and the pressing portion has a pair of pressing claws which are configured to press the short-circuit pieces of the connecting portions, respectively.

8. The head actuator according to claim 7, wherein the male connector has a base fixed on extending end portion of the second flexible printed circuit board and formed of an insulating material, the projection and the pressing portion are provided on the base and protrude therefrom, and the second contact provided on each connecting surface of the projection is connected to the conductor pattern of the second flexible printed circuit board.

9. The connector according to claim 6, wherein the short-circuit piece has elasticity and is configured to elastically deform and contact with the short-circuit contacts when the male connector is detached from the female connectors.

10. The connector according to claim 6, wherein the pressing portion is arranged such that, in a case where the male connector is connected to the female connector, the pressing portion presses the short-circuit piece after the first and second contacts are connected to each other, and in a case where the male connector is disconnected from the female connector, the pressing portion comes apart from the short-circuit piece before the connection between the first and second contacts is released.

11. The head actuator according to claim 6, wherein the base is screwed to the bearing portion.

12. The head actuator according to claim 6, wherein the bearing portion includes a spacer held between the two arms, and the spacer having an abutting portion configured to abut against the projection fitted in the female connectors to position the projection and pressing portion in the extending direction of the arms with respect to the female connector.

13. The head actuator according to claim 6, which further comprises: a support frame extending from the bearing portion and mounted with a driving coil for rocking motion; and a third contact provided on the support frame and connected electrically to the coil, wherein the male connector comprises a fourth contact connected to the conductor pattern of the second flexible printed circuit board and pressed against the third contact to connect the second flexible printed circuit board and the coil electrically to each other.

14. A disk drive comprising:

a disk;

a head configured to write in and retrieving information from the disk;

a head actuator supporting the head for movement with respect to the disk;

a substrate unit configured to input and output signals with respect to the head;

a main flexible printed circuit board extending from the substrate unit and connected to the head actuator; and a male connector attached to the main flexible printed circuit board, wherein the head actuator including a bearing portion; two arms each having a proximal end portion attached to the bearing portion, and a distal end portion supporting the head, extending from the bearing portion, the arms being opposed to each other across a given space; and relay flexible printed circuit boards fixed individually on the respective arms, connected electrically to the respective heads, and extending from the heads to the proximal end portions of the arms, each of the relay flexible printed circuit boards including a connecting portion provided at the proximal end portion of the arm and having first contacts formed by exposing a part of a conductor pattern, a plurality of short-circuit contacts and a short-circuit piece which contacts with the plurality of short-circuit contacts so as to turn the conductor pattern into a closed loop, the connecting portions being opposed to each other across a given space to constitute a female connector, and the male connector including a projection and a pressing portion which are configured to be fitted between the connecting portions of the female connector, and second contacts provided on the projection and connected to a conductor pattern of the second flexible printed circuit board, the second contacts being arranged so as to contact with the first contacts when the projection is fitted between the connecting portions, and the pressing portions being arranged so as to press and detach the short-circuit piece from the short-circuit contacts and release the closed loop, when the pressing portion is fitted between the connecting portions.

15. The disk drive according to claim 14, wherein the first contacts of each connecting portion extend across the extending direction of the arms and are arranged substantially parallel to each other at given spaces in the extending direction of the arm, the plurality of short-circuit contacts are arranged parallel to the first contacts and connected to the respective first contacts independently, the projection has a pair of connecting surfaces opposed individually to the pair of connecting portion of the female connector, the male connector has a plurality of second contacts provided individually on the connecting surfaces of the projection, corresponding to the first contacts, and the pressing portion has a pair of pressing claws which press the short-circuit pieces of the connecting portions, respectively.

16. The disk drive according to claim 14, wherein the male connector has a base fixed on extending end portion of the second flexible printed circuit board and formed of an insulating material, the projection and the pressing portion are provided on the base and protrude therefrom, and the second contact provided on each connecting surface of the projection is connected to the conductor pattern of the second flexible printed circuit board.

17. The disk drive according to claim 14, wherein the short-circuit piece has elasticity and is configured to elastically deform and contact with the short-circuit contacts when the male connector is detached from the female connectors.

18. The disk drive according to claim 14, wherein the pressing portion is arranged such that, in a case where the male connector is connected to the female connector, the pressing portion presses the short-circuit piece after the first and second contacts are connected to each other, and in a case where the male connector is disconnected from the female connector, the pressing portion comes apart from the short-circuit piece before the connection between the first and second contacts is released.

* * * * *